United States Patent
Jacotot

(10) Patent No.: US 7,652,621 B2
(45) Date of Patent: Jan. 26, 2010

(54) METHOD FOR AUTOMATICALLY SELECTING RADIONAVIGATION BEACONS

(75) Inventor: Gregoire Jacotot, Valence (FR)

(73) Assignee: Thales, Neuilly sur Seine (FR)

( * ) Notice: Subject to any disclaimer, the term of this patent is extended or adjusted under 35 U.S.C. 154(b) by 22 days.

(21) Appl. No.: 12/066,503

(22) PCT Filed: Oct. 18, 2006

(86) PCT No.: PCT/EP2006/067556

§ 371 (c)(1),
(2), (4) Date: Mar. 12, 2008

(87) PCT Pub. No.: WO2007/051712

PCT Pub. Date: May 10, 2007

(65) Prior Publication Data

US 2008/0252511 A1 Oct. 16, 2008

(30) Foreign Application Priority Data

Nov. 4, 2005 (FR) ................................. 05 11256

(51) Int. Cl.
*G01S 1/00* (2006.01)

(52) U.S. Cl. .................. 342/357.01; 342/449; 342/463; 342/457

(58) Field of Classification Search .................. 342/29, 342/36, 47
See application file for complete search history.

(56) References Cited

U.S. PATENT DOCUMENTS 3,936,828 A 2/1976 Muesse et al.
5,499,032 A * 3/1996 Kelley et al. ................. 342/463

OTHER PUBLICATIONS

W.B. Ruhnow and M.L. Goemaat: "VOR/DME Automated Station Selection Algorithm", Journal of the Institute of Navigation, vol. 29, No. 4, Feb. 1983, pp. 289-299, XP002397142.
Hargrove, A. "A Comparison of Actual and Simulated Horizontal Flight Paths: RNAV (Area Navigation) System", Southeastcon 81, Conf. Proc., Apr. 5, 1081, pp. 638-642, XP010277403.

* cited by examiner

*Primary Examiner*—Thomas H Tarcza
*Assistant Examiner*—Timothy A Brainard
(74) *Attorney, Agent, or Firm*—Lowe Hauptman Ham & Berner, LLP

(57) ABSTRACT

A method for selecting radionavigation beacons using an onboard navigation system aboard an aircraft from a list of eligible beacons, includes a step for formulating a criterion for selecting a pair of beacons ($B_X$, $B_Y$) from among beacons forming part of a list of eligible beacons, and the selection criterion is based on a search for a maximum duration of membership, for instants subsequent to the instant $t_1$, for which the 2D terrestrial position of the aircraft belongs to the zones of employment of all the pairs of beacons achievable from among the eligible beacons, on the basis of a given predictive trajectory of the aircraft.

20 Claims, 3 Drawing Sheets

METHOD FOR AUTOMATICALLY SELECTING RADIONAVIGATION BEACONS

CROSS-REFERENCE TO RELATED APPLICATIONS

The present Application is based on International Application No. PCT/EP2006/067556, filed on Oct. 18, 2006, which in turn corresponds to French Application No. 05 11256, filed on Nov. 4, 2005, and priority is hereby claimed under 35 USC §119 based on these applications. Each of these applications are hereby incorporated by reference in their entirety into the present application.

FIELD OF THE INVENTION

The field of the invention is that of navigation systems serving aboard an aircraft, to determine the position of the aircraft on the basis of measurements of distance separating the aircraft from radionavigation beacons delivered by equipment of the DME type (English acronym for Distance Measuring Equipment). It relates more particularly to a method of selecting a pair of radionavigation beacons from among a list of eligible beacons that is implemented in such a navigation system.

DISCUSSION OF THE BACKGROUND

It is recalled that distance measuring equipment of the DME type is usually used as an aid to aerial navigation, both en route and during approaches. The function of such equipment is to provide, on interrogation, the distance which separates an aircraft from a ground station (also called a transponder or radionavigation beacon) whose position is known.

Such equipment operates as follows: the aircraft carries an interrogator which interrogates the ground station. The interrogation message consists of a pair of VHF pulses whose spacing and carrier frequency are defined by the ICAO (International Civil Aviation Organization), depending on the type of DME and its location which are known to the transponder. When the transponder receives and recognizes these pulses, it emits a response destined for the aircraft. The response also takes the form of a pair of pulses of defined spacing and carrier frequency, emitted with a likewise defined delay, the whole being fixed by the standards of the ICAO and therefore known to the interrogator. When the interrogator of the aircraft receives and recognizes this response it deduces the distance which separates it from the transponder from the duration of the outward-return journey of the pulses.

The terrestrial surface of the globe is meshed by a more or less dense network of beacons. The position of these beacons is known and stored in a database onboard the aircraft. At each instant, only a small number of these beacons is accessible to the aircraft to provide it with a distance measurement, one speaks of eligible beacons.

It is known that the measurement of the altitude of the aircraft by distance measuring equipment of the DME type is inaccurate because of the ground position of the beacons, this is the reason why the aircraft altitude measurement is carried out, in general, by some other means as for example, an anemo-barometric probe. In this case, the locating of the aircraft by the distance measuring equipment of the DME type amounts, when the measurements are carried out with an infinitely large accuracy, to a two-dimensional problem that can be solved by virtue of measurements of distance separating the aircraft from two beacons.

Represented in FIG. 1 is the principle of locating the aircraft on the terrestrial surface, by making the assumption of a two-dimensional world: a measurement of the distance separating the aircraft from a first beacon ($B_X$) projected onto the terrestrial surface equals $dlm_X$, and a measurement of the distance separating the aircraft from a second beacon ($B_Y$) projected onto the ground equals $dlm_Y$. The intersection of the circle of radius $dlm_X$ centered on the position of the beacon $B_X$ and of the circle of radius $dlm_Y$ centered on the position of the beacon $B_Y$ provides an estimation of the 2D terrestrial position of the aircraft PTEA.

Hereinafter, the 2D terrestrial position of an object or point is defined as the location of the object or point in a terrestrial reference frame, which is not necessarily plane, when its altitude is considered to be zero. The 2D terrestrial position can for example be expressed in the form of a longitude value and a latitude value.

In reality, the accuracy of a distance measurement delivered by a beacon is not infinite. It is possible to show that, in the case where N distance measurements of identical accuracy (with N greater than or equal to two) are carried out simultaneously employing N beacons, the accuracy of the estimation of the 2D terrestrial position of the aircraft increases with the number of beacons employed (N), when the beacons are positioned in an optimal manner. The optimal positions of the beacons correspond to arrangements where the angles between the geodesics relating the 2D terrestrial position of the aircraft and the 2D terrestrial positions of the N beacons used are close to $\pi/N$ radians. But, the duration required in order to choose an optimal configuration comprising a number (greater than or equal to two and not fixed a priori) of beacons from among a number of eligible beacons which may exceed about forty is prohibitive. One prefers therefore to limit oneself to searching for a pair of beacons, arranged in an optimal way, from a list of eligible beacons.

In the prior art, the estimation of the 2D terrestrial position of the aircraft at an instant $t_2$ implements a method of selecting a pair of beacons which searches for, on the basis of the knowledge of the 2D terrestrial position of the aircraft at an instant $t_1$ prior to $t_2$ and of the position information for the beacons, contained in the database, the pair of beacons whose measurements of the distances which separate them from the aircraft are capable of producing the most accurate estimation of the 2D terrestrial position of the aircraft at this instant. The beacons making up the pair are those which have a 2D terrestrial position such that the angle ($\Delta\theta$) formed by the geodesics connecting the 2D terrestrial position of the aircraft to the 2D terrestrial positions of each of the beacons used is closest to $\pi/2$ radians.

This method has the advantage of providing, at any instant, a measurement of the 2D terrestrial position of the aircraft which is the most accurate achievable with two beacons. However, the selection criterion that the method uses exhibits the drawback, when the selection method is implemented in a repeated manner, of producing a frequent change of one or more selected beacons, for example in the case of the aircraft overflying a terrestrial zone dense with beacons. Now, a beacon modification requires a duration of initialization, that may be up to five seconds, which is related to a change of carrier frequency of the message emitted by the interrogator and this duration of initialization reduces the availability of the estimation of the 2D terrestrial position of the aircraft. Additionally, modifying the pair of selected beacons is detrimental to the continuity of the position estimation of the aircraft over time since it disturbs the setting up of processing operations allowing estimation of the biases of the beacons. A prior art solution consists in reducing the frequency of implementing the selections of the pairs of beacons by triggering the beacon selections on the basis of a criterion for modifying the current pair of selected beacons. The modification criterion can be, for example, fixing a floor value of the accuracy of the position estimation. This accuracy can, itself, be estimated by means of evaluating the angle $\Delta\theta$. A beacon selection is retained so long as the evaluation of the accuracy of the estimation of the aircraft position carried out by means of the pair of selected beacons indicates that it has a value greater than the floor value. As soon as this is no longer the case a new selection of beacons takes place. But such a reduction in the beacon selection frequency based solely on the accuracy of the position estimation can make it necessary to fix a relatively low accuracy floor value and does not guarantee that the estimation accuracy value will be maintained over time. In particular, even if a selection of beacons is stable over a time period, there is no certainty that the pair of beacons selected at the start of the period is that which provides a position estimation with the best accuracy over the whole period.

SUMMARY OF THE INVENTION

A significant aim of the invention is therefore to alleviate this drawback. More precisely, it is intended to avoid frequent changes of selected beacons by modifying on the one hand the criterion considered for selecting the beacons, which should no longer be based only on the accuracy of the position estimation of the aircraft at a given instant but also on the capacity to retain a beacon selection over the most extended possible flight duration, by introducing on the other hand, a criterion for modifying the selection of the beacons. To summarize, the aim pursued is therefore to favor a choice of a pair of beacons making it possible to ensure a given position estimation accuracy, over the most extended possible duration of aircraft flight.

According to the invention, there is proposed a method for selecting radionavigation beacons using an onboard navigation system aboard an aircraft from a list of eligible beacons $(B_1, \ldots, B_n)$ at an instant $t_2$, a position $A(t_1)$ taken by the aircraft in a reference frame tied to the Earth at an instant $t_1$ prior to $t_2$ being known, a projection of the position of the aircraft onto the 2D terrestrial globe according to the vertical to the aircraft being designated as the 2D terrestrial position of the aircraft, the eligible beacons being arranged on the terrestrial surface at known positions which are stored in a database with which the aircraft is equipped, a domain of employment of an eligible beacon $B_i$ defining a set of 2D terrestrial positions of the aircraft corresponding to positions of the aircraft for which a measurement of distance separating the aircraft and the beacon $B_i$ is relevant, an employment zone $Z_{X,Y}(\theta, t_1)$ of a pair of eligible beacons $(B_X, B_Y)$ being defined by an intersection between the employment domains of the beacons $B_X$ and $B_Y$ and a geometric locus that groups together 2D terrestrial positions of the aircraft for which an angle formed by axes connecting the 2D terrestrial position of the aircraft and the positions of the beacons $B_X$ and $B_Y$ is greater than a predefined value $\theta$, the employment zone $Z_{X,Y}(\theta, t_1)$ being delimited by a boundary. The method comprises a step for formulating a criterion for selecting a pair of beacons $(B_X, B_Y)$ from among the beacons forming part of the list of eligible beacons, and in that the selection criterion is based on a search for a maximum duration of membership, for instants subsequent to the instant $t_1$, for which the 2D terrestrial position of the aircraft belongs to the zones of employment of all the pairs of beacons achievable from among the eligible beacons, on the basis of a given predefined trajectory of the aircraft.

This method makes it possible to select a pair of beacons providing distance measurements which allow accurate estimation of the 2D terrestrial position of the aircraft while guaranteeing stability of the selection which benefits the continuity of the estimation. In certain aircraft flight configurations, this method leads to a thirty percent reduction in the modifications for selecting the choice of beacon with respect to a prior art method employing a selection criterion based on searching for maximum accuracy in the estimation of the position and a criterion for modifying the selection of the beacon pair triggering a new selection based on an accuracy floor.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DESCRIPTION OF THE INVENTION

To facilitate the reading of the description, the same references will designate the same elements in the various figures.

The entirety of the beacons meshing the terrestrial surface is not usable at any moment by an interrogator placed on an aircraft in flight.

A first condition of use of a beacon is dictated by the "visual" accessibility of the beacon from the aircraft at an instant $t_2$. Only a beacon situated under the horizon, seen from the aircraft, is considered to be accessible. This preliminary selection is carried out on the basis of the knowledge of a position of the aircraft A ($t_1$) arising from an estimation at an instant $t_1$ prior to $t_2$ and of the positions of the beacons which are stored in a database onboard the aircraft. The positions of the beacons and of the aircraft can be expressed, for example, in the form of a altitude, 2D terrestrial position doublet. The altitude of the aircraft, determined as has been seen by a different means from the distance measuring equipment, makes it possible to access the angle ($\psi_{HOR}$) between a vertical axis $Z_A$ passing through the position of the aircraft and the direction from which the horizon is seen. It is possible additionally to evaluate a value of the angle ($\psi_i$) separating the axis $Z_A$ and the direction of a straight line connecting the position of the aircraft A ($t_1$) to the position of the beacon $B_i$ where i designates a beacon index. When the value of the angle $\psi_i$ is less than that of the angle $\psi_{HOR}$, the beacon $B_i$ forms part of the accessible beacons. A second condition of use of the beacons can be imposed by a pilot of the aircraft who on his own authority can exclude one or more beacons from the list of accessible beacons.

Figure 1:
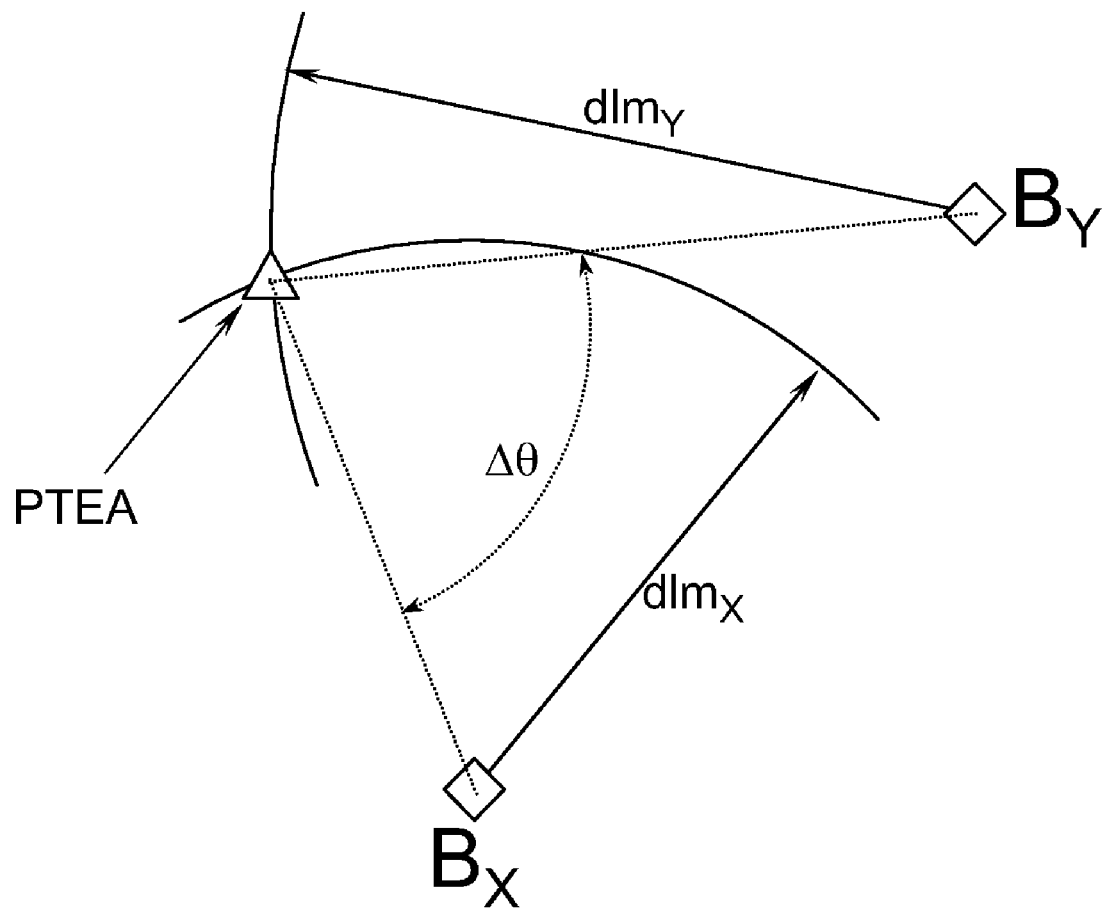
FIG. 1, already described, schematically represents the principle of estimating a 2D terrestrial position of an aircraft on the basis of two distance measurements delivered by a pair of radionavigation beacons.
Figure 2:
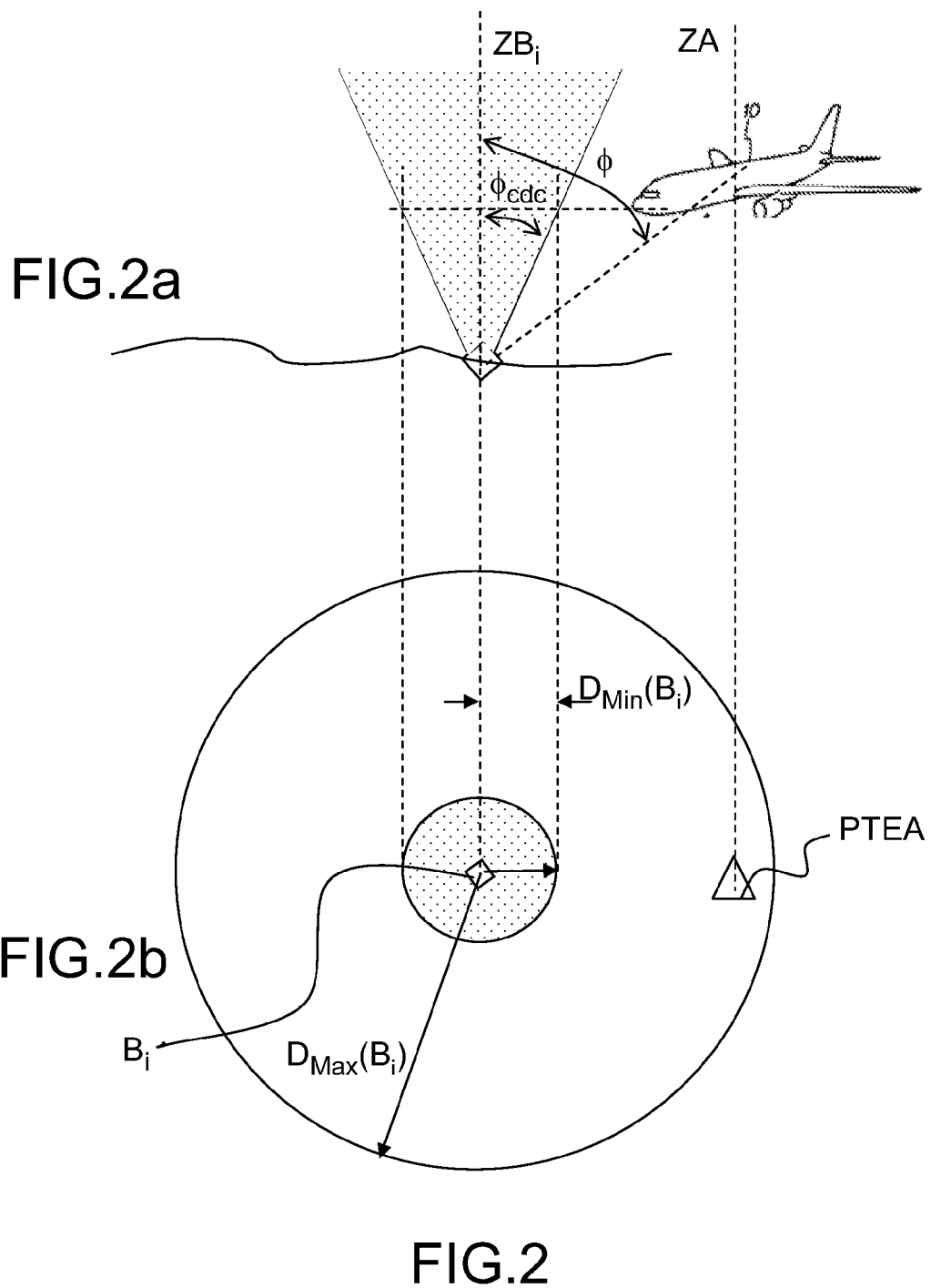
FIG. 2 represents an exemplary employment domain for a beacon placed on the terrestrial surface.

Additionally, a radionavigation beacon arranged on the terrestrial surface possesses a limited employment domain. A first type of limitation of a beacon's domain of employment relates to an operability defect of the beacon when an interrogator is situated in proximity to a vertical axis passing through the beacon. This limitation, known by the name "cone of confusion", conveys the fact that the distance measurements delivered by a beacon are considered to be unusable, because they are too inaccurate, when the interrogator is close to the vertical of the beacon. FIG. 2a illustrates an exemplary shape of a cone of confusion: the beacon $B_i$ is usable by an interrogator carried by an aircraft on condition that the value of the angle formed by $ZB_i$ a vertical axis passing through the position of the beacon $B_i$ and an axis connecting the position of the aircraft and the position of the beacon $B_i$ is greater than a fixed angle $\Phi_{cdc}$ that may be equal, for example, to $\pi/6$ radians. This same limitation expressed this time viewed from above is illustrated by FIG. 2b. As a function of the altitude H of the aircraft, the beacon is, for example, usable by an interrogator only on condition that the aircraft which carries it has a 2D terrestrial position situated outside a circle centered on the position of the beacon $B_i$, of radius $D_{Min}(B_i) = H \tan(\Phi_{cdc})$. The characteristics of the cones of confusion of all the beacons are, for example, stored in the database.

A second type of limitation of the employment domain relates to maximum distances beyond which the beacon $B_i$ is no longer usable. These limitations are of a regulatory nature, they stem from the technical characteristics of the beacons, described by "Figure Of Merit" (FOM) and class parameters, or else flight safety parameters in the form of a "Required Navigation Performance" (RNP) indicator whose value is assigned by the air traffic control authority to the pilot. The values of the parameters of the beacons are stored in the database. This type of limitation gives rise to a maximum distance $D_{Max}(B_i)$ beyond which an interrogator can no longer use the beacon $B_i$. In general, no distinction is made between the employment limitations related to the technical characteristics of a beacon and those related to the "visual" accessibility of the beacon for assigning a value to the parameter $D_{Max}(B_i)$.

Advantageously, a definition of the domain of employment of a beacon depends on the technical characteristics of the beacon and in that the technical characteristics are stored in a database with which the aircraft is equipped.

Advantageously, the database meets the ARINC 424 standard.

The beacon employment limitations define an employment domain about the position of each beacon. The domain of employment of each beacon $B_i$ is, for example, a part of the ground delimited by two circles of radii $D_{Min}(B_i)$ and $D_{Max}(B_i)$. If the distance gap separating a 2D terrestrial position of an aircraft and a beacon $B_i$ is less than $D_{Max}(B_i)$ and greater than $D_{Min}(B_i)$, the beacon $B_i$ can deliver distance measurements that may contribute to the estimation of a 2D terrestrial position of the aircraft, in the converse case, the beacon $B_i$ cannot be used by the aircraft.

Advantageously, the definition of a domain of employment of a beacon depends on an aircraft position.

According to the prior art, a beacon selection method, determines, from among the beacons referenced in the database onboard the aircraft, those whose employment domain contains the 2D terrestrial position of the aircraft: these are the eligible beacons. Subsequently, the method selects, from among the eligible beacons, a pair of beacons $(B_X, B_Y)$ whose 2D terrestrial positions minimize a merit factor $\sigma_{position}$. The merit factor $\sigma_{position}$ evaluates the accuracy of a 2D terrestrial position estimation of an aircraft on the basis of two distance measurements carried out by virtue of a pair of beacons $(B_X, B_Y)$ with identical accuracy $\sigma$. It is possible to show that:

$$\sigma_{position} = \sigma \sqrt{\frac{2}{(\sin(\Delta\theta))^2}}$$

where $\Delta\theta$ is the angle formed by the straight lines connecting the 2D terrestrial position of the aircraft and the 2D terrestrial positions of the beacons $B_X$ and $B_Y$. This selection criterion is aimed at selecting a beacon pair solely on the basis of the accuracy with which the 2D terrestrial position estimation is performed at a given instant. Practically, this selection criterion amounts to selecting the beacons $B_X$ and $B_Y$ which are arranged in such a way that $\Delta\theta$ is the closest to $\pi/2$ radians, since this value of $\Delta\theta$ minimizes the value of $\sigma_{position}$.

When a selection of a pair of beacons is repeated between regular time intervals, even when the modification of the selection is subordinated to the satisfaction of a modification criterion based on the value of the accuracy of the estimation, it can lead to relatively frequent modifications of the choice of selected beacons. These modifications can arise, in particular, in the case of overflying a region of the globe where the distribution of the beacons is relatively dense as in Europe, the United States of America and in certain regions of Asia. This constitutes a drawback in terms of information availability. Specifically, on initializing the communications between an interrogator onboard an aircraft and a beacon, the establishing of the communications between the interrogator and the beacon takes a certain length of time. The measurement of distance between the aircraft and the beacon is therefore not immediately available after selecting a new beacon pair. If selection modifications occur frequently, the duration of initialization of the communications can become of the same order as that during which a 2D terrestrial position estimation of the aircraft is actually delivered. There is therefore a requirement to devise a new beacon selection criterion which takes into account the temporal stability of the selection of the beacons and favors it.

A new criterion can be expressed by means of a distance, separating, at a given moment, the aircraft from the boundaries of an employment zone consisting of the intersection of the domains of employment of a pair of selected beacons. Here, "distance" defines the value of the shortest distance separating the 2D terrestrial position of the aircraft from one of the points constituting the boundary of the employment zone. Specifically, whatever the trajectory and the speed of the aircraft, the larger this distance and the longer the duration required for the aircraft to exit, at predefined speed, the employment zone, the less it will consequently be necessary to change the selection of the beacons.

Figure 3:
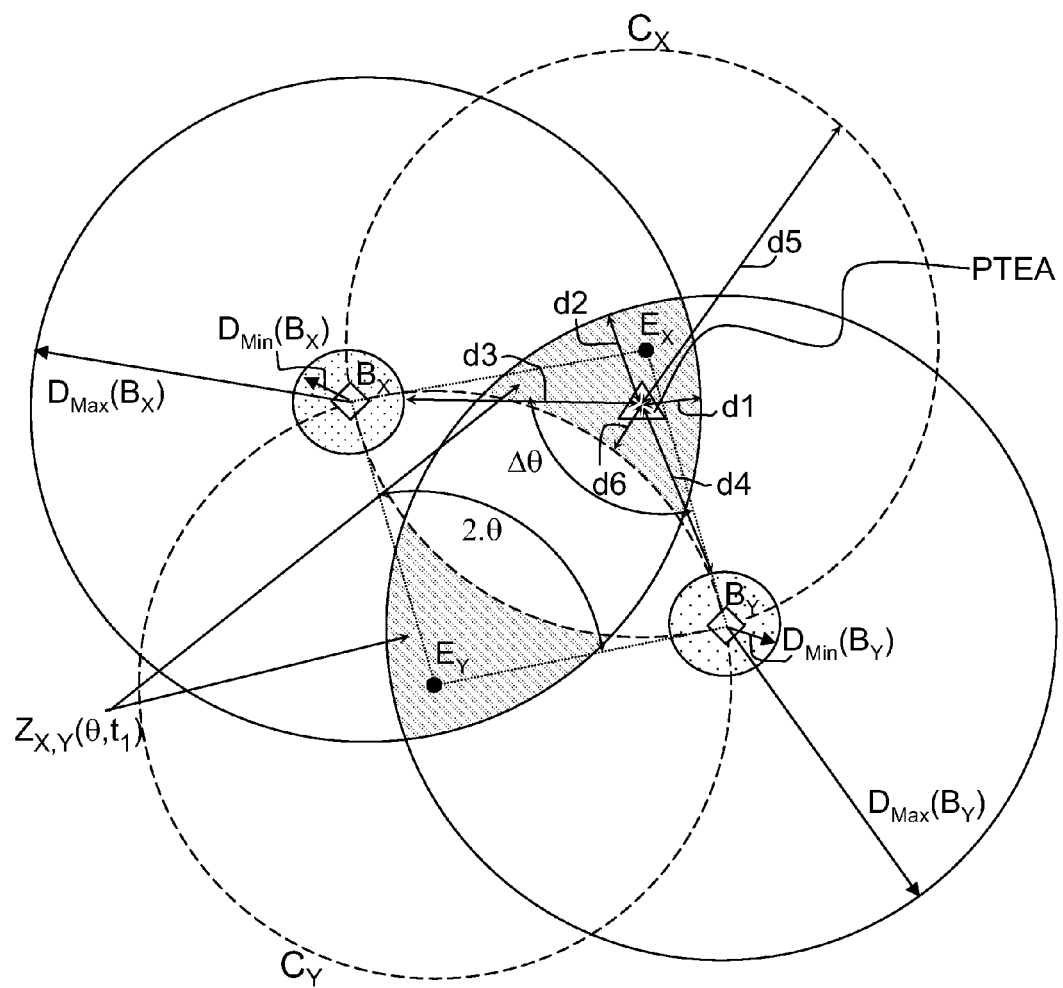
FIG. 3 represents a zone of employment of a beacon pair $(B_X, B_Y)$ and explains parameters occuring in the implementation of a method of selecting a pair of beacons according to the invention.

FIG. 3 makes it possible to represent the quantities coming into play in such a criterion: the 2D terrestrial position of the aircraft 10 is represented by a triangle, the position of two beacons $B_X$ and $B_Y$ is represented by two diamonds. About the 2D terrestrial position of each beacon, stored in the database onboard the aircraft, an employment domain is delimited, as in FIG. 2, which is delimited by two circles of radius $D_{Min}(B_i)$ and $D_{Max}(B_i)$. A zone of employment of the pair of beacons ($B_X$, $B_Y$) is defined as the intersection of the employment domains of the beacons $B_X$ and $B_Y$ selected by the aircraft.

If an accuracy threshold regarding the estimation of a 2D terrestrial position of the aircraft is added, this amounts to desiring that the angle $\Delta\theta$ at which the aircraft "sees" the beacons $B_X$, $B_Y$, is greater than a predefined value 74. Two circles $C_X$, $C_Y$, with center $E_X$ and $E_Y$ are plotted, intercepting $B_X$ and $B_Y$ such that the angle ($\overrightarrow{E_X B_X}$, $\overrightarrow{E_X B_Y}$) is equal to the angle ($\overrightarrow{E_Y B_Y}$, $\overrightarrow{E_Y B_X}$) and equals $2\theta$ where $\theta$ is a predefined value.

In this case, the employment zone $Z_{X,Y}(\theta, t_1)$, at the instant $t_1$, is then restricted (hatched zone in FIG. 3) to the loci of the 2D terrestrial positions of an aircraft consisting of the intersection of the employment domains of the selected beacons and of the loci where the 2D terrestrial position of the aircraft corresponds to $\Delta\theta > \theta$. Thus, when the aircraft has a 2D terrestrial position belonging to the employment zone $Z_{X,Y}(\theta, t_1)$, the accuracy of the estimation of its 2D terrestrial position carried out by virtue of the selected beacons is less than $$\sigma \sqrt{\frac{2}{(\sin(\theta))^2}}$$

where $\sigma$ is the accuracy of the measurement of distances leading to the aircraft 2D terrestrial position estimation.

In a first embodiment of the method for selecting beacons, it is possible to consider that the criterion for selecting a pair of beacons can be expressed as selecting a pair of beacons ($B_X$, $B_Y$) with a view to maximizing the duration necessary for the aircraft to exit the employment zone $Z_{X,Y}(\theta, t_1)$, a speed of the aircraft being given. This criterion can also be expressed in distance terms, in this case one seeks to maximize the distance separating the 2D terrestrial position of the aircraft from the boundaries of the employment zone $Z_{X,Y}(\theta, t_1)$.

Accordingly, one seeks to express, at an instant $t_1$, $D_{X,Y}(\theta, t_1)$ the shortest distance separating the 2D terrestrial position of the aircraft $A(t_1)$ taken at the instant $t_1$ from the boundaries of the employment zone $Z_{X,Y}(\theta, t_1)$, $\theta$ being fixed. This search is done on the basis of the knowledge of $A(t_1)$ and of the 2D terrestrial positions of the beacons stored in the database onboard the aircraft, it is carried out independently of the searches done on the basis of the past and future positions of the aircraft. At the instant $t_1$, as at each iteration of the search, a list of eligible beacons and their respective employment domain are defined, and for each beacon pair ($B_X$, $B_Y$) the distance $D_{X,Y}(\theta, t_1)$ following a predefined trajectory of the aircraft is evaluated, so as to choose the pair of beacons ($B_X$, $B_Y$) corresponding to a maximum value of $D_{X,Y}(\theta, t_1)$. This embodiment can make it possible to very substantially reduce (up to 30%) the number of different beacon pairs selected for a given trajectory of the aircraft with respect to a prior art method.

A procedure for rapidly estimating the value of $D_{X,Y}(\theta, t_1)$ is proposed below.

The distance, along the terrestrial surface, separating the 2D terrestrial position of the beacon $B_i$ and the 2D terrestrial position of an aircraft $A(t)$, at the instant t, is defined by $r_i(t)$. $r_i(t)$ is a distance estimated on the basis of the knowledge of $A(t)$ and of the 2D terrestrial positions of beacons, it is calculated according to a terrestrial model, for example, the WGS4 terrestrial model. Finally, $\text{dist}_{X,Y}(\alpha, \theta, t)$ defines the function which associates with a beacon pair ($B_X$, $B_Y$), a 2D terrestrial position of the aircraft at the instant t, and an angle $\alpha$, a distance such that:

$$\frac{\sqrt{r_X(t)^2 + r_Y(t)^2 - 2 \cdot r_X(t) \cdot r_Y(t) \cdot \cos(|\Delta\theta| + \alpha)}}{2 \cdot \sin(\theta)}$$

where $\Delta\theta$ is the angle formed by axes connecting the 2D terrestrial position of the aircraft and the 2D terrestrial position of the beacons $B_X$ and $B_Y$ and where $\theta$ is a desired minimum value for $\Delta\theta$.

On the basis of these definitions, it is possible to introduce six functions making it possible to define $D_{X,Y}(t, \theta)$ the distance separating the position of the aircraft at the instant t, from the boundaries of the zone of employment of the beacons $B_X$, $B_Y$, an illustration of which is presented in FIG. 3.

$d1_X(t) = D_{Max}(B_X) - r_X(t)$ $d2_Y(t) = D_{Max}(B_Y) - r_Y(t)$ $d3_X(t) = r_X(t) - D_{Min}(B_X)$ $d4_Y(t) = r_Y(t) - D_{Min}(B_Y)$ $d5_{X,Y}(\theta, t) = \text{dist}_{X,Y}(2\theta, \theta, t) - \text{dist}_{X,Y}(0, \theta, t)$ $d6_{X,Y}(\theta, t) = \text{dist}_{X,Y}(0, \theta, t) - \text{dist}_{X,Y}(-2\theta, \theta, t)$ It is possible to consider, for example, that at the instant $t_1$, the minimum distance $D_{X,Y}(\theta, t_1)$ separating the position of the aircraft from the boundaries of the employment zone $Z_{X,Y}(\theta, t_1)$ can be defined as the minimum value of ($d1_X(t_1)$, $d2_Y(t_1)$, $d3_X(t_1)$, $d4_Y(t_1)$, $d5_{X,Y}(\theta,t_1)$, $d6_{X,Y}(\theta, t_1)$).

This first embodiment can be presented in the form of a second approach in which the predefined trajectory consists of a rectilinear motion of predefined nonzero speed V, from the 2D terrestrial position $A(t_1)$ taken by the aircraft at the date $t_1$ to a position of a point B belonging to the boundary of the employment zone $Z_{X,Y}(\theta, t_1)$, the position of the point B on the boundary minimizing the distance separating $A(t_1)$ and positions of the points of the boundary of the employment zone $Z_{X,Y}(\theta, t_1)$.

In a second embodiment of the method for selecting beacons, the selection of the pair of beacons is carried out on the basis of assumptions on the 2D terrestrial position taken by the aircraft in the instants following $t_1$. This embodiment leads to the evaluation, for each possible employment zone, defined by a pair of beacons from among the eligible beacons and a value of an angle $\theta$, of the duration required for the 2D terrestrial position of the aircraft to exit the zone of employment of the relevant pair of selected beacons. Various assumptions about the predefined trajectory of the aircraft can be envisaged:

Advantageously, the predefined trajectory consists in prolonging the motion of the aircraft at the instant $t_1$ by a uniform rectilinear motion.

Advantageously, the predefined trajectory is determined on the basis of data featuring in a flight plan onboard the aircraft.

The two embodiments of the method make it possible to evaluate, for each pair of beacons, the duration on completion of which the 2D terrestrial position of the aircraft exits the zone of employment of the selected pair of beacons. The selection criterion is aimed at selecting the beacon pair corresponding to the duration of membership in the employment zone having the maximum value.

Advantageously, the method according to the invention comprises a step for selecting a pair of beacons according to the selection criterion.

To further limit the modifications for selecting beacons, it is possible moreover to formulate a criterion for modifying the current selection of the pair of selected beacons. This criterion being applied before each run of a beacon selection operation.

This modification criterion can for example be based on a comparison of the distance $D_{X,Y}(\theta, t_1)$ separating the 2D terrestrial position of the aircraft $A(t_1)$ at the instant $t_1$ from the employment zone $Z_{X,Y}(\theta, t_1)$ defined by the beacon pair $(B_X, B_Y)$ selected, for a predefined value of $\theta$, with the distances separating the 2D terrestrial position of the aircraft $A(t_1)$ from all the possible employment zones defined on the basis of the eligible pairs of beacons, for a constant value of the angle $\theta$, at the instant $t_1$.

So that the beacon selection modification criterion is homogeneous with the beacon selection criterion, it is also possible to express it by employing durations rather than distances.

Thus, it is possible to define $T_{x,y}(\theta, t_1)$ a duration of membership for which the 2D terrestrial position of the aircraft belongs to the employment zone $Z_{X,Y}(\theta, t_1)$, on the basis of the 2D terrestrial position that the aircraft occupies at $t_1$, when the aircraft follows the given predefined trajectory of the aircraft.

Advantageously, the method according to the invention comprises a step for formulating a criterion for modifying the selection of the pair of beacons $(B_X, B_Y)$, and in that the modificatin criterion is based on a comparison of the value of $T(t_1)$ and of the product $k.T_{X,Y}(\theta, t_1)$, when $T(t_1)$ is the maximum duration of membership in the zones of employment of all possible pairs from among the eligible beacons except for the pair $(B_X, B_Y)$, on the basis of the 2D terrestrial position of the aircraft at the instant $t_1$, by following the predefined trajectory of the aircraft, and k is a parameter whose value is predefined.

Advantageously, the method according to the invention comprises:
a step for evaluating, according to the modification criterion, the modification of the pair of beacons $(B_X, B_Y)$;
when the value of $k.T_{X,Y}(\theta, t_1)$ is less than the value of $T(t_1)$, a step for making a new selection of a beacon pair according to the selection criterion.

The method according to the invention implements two parameters $(\theta, k)$ whose values are predefined and make it possible to adjust the dynamic operation of the method while favoring the accuracy of the estimation (value of $\theta$ close to $\pi/2$ radians) or else the stability of the selection of the beacons (values of k close to 0). An example of values assigned to the parameters is for example $(\theta, k)=(\pi/4, 150\%)$.

However, it is conceivable for the values assigned to the parameters $(\theta, k)$ to be fixed dynamically as a function of elements related to the conditions.

Advantageously, the vfunction of the flight phases of the aircraft.

Advantageously, the values of k and of $\theta$ are adapted, over time, as a function of the value of the "Required Navigation Performance" (RNP) of the trajectory followed by the aircraft.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. A method of selecting radionavigation beacons implemented in an onboard navigation system aboard an aircraft from a list of
eligible beacons at an instant $t_2$,
a position $A(t_1)$ taken by the aircraft in a reference frame tied to the Earth at an instant $t_1$ prior to $t_2$ being known,
a projection of the position of the aircraft onto the 2D terrestrial globe according to the vertical to the aircraft being dubbed the 2D terrestrial position of the aircraft,
the eligible beacons being arranged on the terrestrial surface at known positions which are stored in a database with which the aircraft is equipped,
a domain of employment of an eligible beacon $B_i$ defining a set of 2D terrestrial positions of the aircraft corresponding to positions of the aircraft for which a distance measurement separating the aircraft and the beacon $B_i$ is relevant,
an employment zone $Z_{X,Y}(\theta, t_1)$ of a pair of eligible beacons being defined by an intersection between the employment domains of the beacons $B_X$ and $B_Y$ and a geometric locus that groups together 2D terrestrial positions of the aircraft for which an angle formed by axes connecting the 2D terrestrial position of the aircraft and the positions of the beacons $B_X$ and $B_Y$ is greater than a predefined value $\theta$,
the employment zone $Z_{X,Y}(\theta, t_1)$ being delimited by a boundary, said method comprising:
formulating a criterion for selecting a pair of beacons $(B_X, B_Y)$ from among the beacons forming part of the list of the eligible beacons,
wherein the selection criterion is based on a search for a maximum duration of membership, for instants subsequent to the instant $t_1$, for which the 2D terrestrial position of the aircraft belongs to the zones of employment of all the pairs of beacons achievable from among the eligible beacons, on the basis of a given predefined trajectory of the aircraft.

2. The method for selecting beacons as claimed in claim 1 further comprising a step for selecting a pair of beacons according to the selection criterion.

3. The method for selecting beacons as claimed in claim 1, a 2D terrestrial position of the aircraft at the instant $t_1$ being known, a pair of beacons $(B_X, B_Y)$ being selected, at the instant $t_1$, an employment zone $Z_{X,Y}(\theta, t_1)$ being defined by the pair of selected beacons $(B_X, B_Y)$ and a value $\theta$ predefined, a duration of membership $T_{X,Y}(\theta, t_1)$ of the aircraft in the employment zone $Z_{X,Y}(\theta, t_1)$, on the basis of the position by following the predictive trajectory of the aircraft, the method further comprising
a step for formulating a criterion for modifying the selection of the pair of beacons $(B_X, B_Y)$, wherein the modification criterion is based on a comparison of the value of $T(t_1)$ and of the product $k.T_{X,Y}(\theta, t_1)$, when $T(t_1)$ is the maximum duration of membership in the zones of employment of all possible pairs from among the eligible beacons except for the pair $(B_X, B_Y)$, on the basis of the 2D terrestrial position of the aircraft at the instant $t_1$, by following the predictive trajectory of the aircraft, and k is a parameter whose value is predefined.

4. The method for selecting beacons as claimed in claim 3 further comprising:
evaluating, according to the modification criterion, the modification of the pair of beacons $(B_X, B_Y)$; and
making a new selection of a beacon pair according to the selection criterion when the value of $k.T_{X,Y}(\theta, t_1)$ is less than the value of $T(t_1)$.

5. The method for selecting beacons as claimed in claim 3, wherein the definition of the domain of employment of a beacon depends on the technical characteristics of the beacon and in that the technical characteristics are stored in the database.

6. The method for selecting beacons as claimed in claim 5, wherein the database meets the ARINC 424 standard.

7. The method for selecting beacons as claimed in claim 6, wherein the values of k and of $\theta$ are adapted, over time, as a function of the flight phases of the aircraft.

8. The method for selecting a beacon as claimed in claim 7, wherein the values of k and of $\theta$ are adapted, over time, as a function of the value of the "Required Navigation Performance" (RNP) of the trajectory followed by the aircraft.

9. The method for selecting beacons as claimed in 3 wherein the predefined trajectory consists in prolonging the motion of the aircraft at the instant $t_1$ by a uniform rectilinear motion.

10. The method for selecting beacons as claimed in 3 wherein the predefined trajectory is determined on the basis of data featuring in a flight plan onboard the aircraft.

11. The method for selecting beacons as claimed in claim 3 wherein the predefined trajectory consists of a rectilinear motion of predefined nonzero speed V, from the 2D terrestrial position $A(t_1)$ taken by the aircraft at the date $t_1$ to a position of a point B belonging to the boundary of the employment zone $Z_{X,Y}(\theta, t_1)$, the position of the point B on the boundary minimizing the distance separating $A(t_1)$ and positions of the points of the boundary of the employment zone $Z_{X,Y}(\theta, t_1)$.

12. The method for selecting beacons as claimed in claim 3 wherein a definition of a domain of employment of a beacon depends on an aircraft position.

13. The method for selecting beacons as claimed in 1 wherein the predefined trajectory consists in prolonging the motion of the aircraft at the instant $t_1$ by a uniform rectilinear motion.

14. The method for selecting beacons as claimed in 1 wherein the predefined trajectory is determined on the basis of data featuring in a flight plan onboard the aircraft.

15. The method for selecting beacons as claimed in claim 1 wherein the predefined trajectory consists of a rectilinear motion of predefined nonzero speed V, from the 2D terrestrial position $A(t_1)$ taken by the aircraft at the date $t_1$ to a position of a point B belonging to the boundary of the employment zone $Z_{X,Y}(\theta, t_1)$, the position of the point B on the boundary minimizing the distance separating $A(t_1)$ and positions of the points of the boundary of the employment zone $Z_{X,Y}(\theta, t_1)$.

16. The method for selecting beacons as claimed in claim 1 wherein a definition of a domain of employment of a beacon depends on an aircraft position.

17. The method for selecting beacons as claimed in claim 1 wherein the definition of the domain of employment of a beacon depends on the technical characteristics of the beacon and in that the technical characteristics are stored in the database.

18. The method for selecting beacons as claimed in claim 17 wherein the database meets the ARINC 424 standard.

19. The method for selecting beacons as claimed in claim 18, wherein the values of k and of $\theta$ are adapted, over time, as a function of the flight phases of the aircraft.

20. The method for selecting a beacon as claimed in claim 19, wherein the values of k and of $\theta$ are adapted, over time, as a function of the value of the "Required Navigation Performance" (RNP) of the trajectory followed by the aircraft.

\* \* \* \* \*